N. LEE.
SPEEDOMETER.
APPLICATION FILED SEPT. 11, 1914.

1,189,843.

Patented July 4, 1916.

Witnesses:

Inventor,
Nixon Lee,
By his Attorneys
Meyers Cushman & Rea

UNITED STATES PATENT OFFICE.

NIXON LEE, OF BROOKLYN, NEW YORK, ASSIGNOR TO SEARS-CROSS COMPANY, OF BROOKLYN, NEW YORK, A CORPORATION OF NEW YORK.

SPEEDOMETER.

1,189,843.   Specification of Letters Patent.   Patented July 4, 1916.

Application filed September 11, 1914. Serial No. 861,240.

*To all whom it may concern:*

Be it known that I, NIXON LEE, a citizen of the United States, residing at Brooklyn, in the county of Kings and State of New York, have invented new and useful Improvements in Speedometers, of which the following is a specification.

This invention relates to speedometers, or speed indicators and particularly to such instruments which are of the centrifugal type, that is, instruments which embody in their construction a centrifugal weight which is rotated at a high speed by a part the speed of which is to be measured; the action of the centrifugal force upon this weight tends to move it from its normal position and the amount of movement is imparted to a needle or pointer coöperating with a scale indicating the speed, for instance, in miles per hour. The movement of this weight under the action of the centrifugal force is usually resisted by a spring and the mechanism for imparting the movement to the needle is usually such that the amount of movement of the needle along the scale at different points is unequal for the same changes in speed. This requires a scale especially adapted to the particular instrument and in which the divisions are not uniformly spaced. This necessitates considerable labor in effecting the accurate calibration of the instrument.

In one aspect, the present invention may be regarded as an improvement on the speedometer disclosed in my co-pending application Serial No. 807,628.

One of the objects of the present invention is to provide very simple means for insuring an accurate and uniform movement of the needle for the same change of speed at different points on the scale.

A further object of this invention is to provide a construction enabling the use of a relatively long spring which operates to give a relatively accurate reading on the scale.

Further objects of the invention will appear more clearly hereinafter.

The invention consists in the general combination of parts and features hereinafter described, all of which contribute to produce an efficient speed measuring instrument.

A preferred embodiment of my invention will be particularly described in the following specification while the broad scope of my invention will be pointed out in the appended claims.

Figure 1:
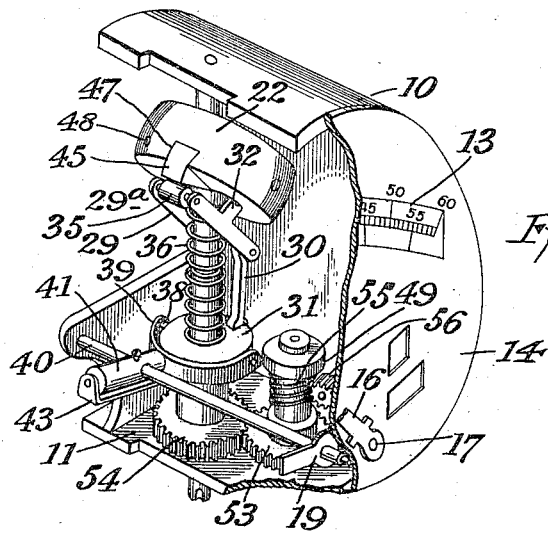
Figure 2:
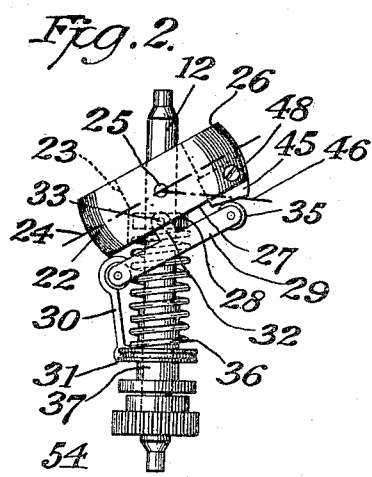
Figure 3:
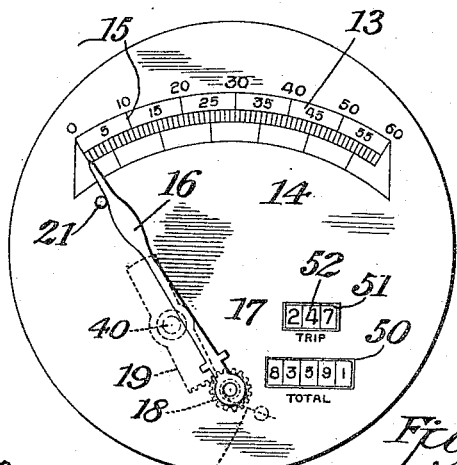
Figure 4:
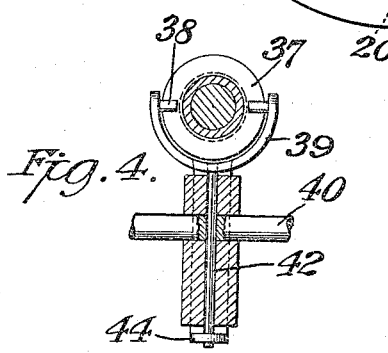

In the drawings,—Figure 1 is a perspective showing a speedometer with the case broken away and illustrating parts of the mechanism embodied in the invention. Fig. 2 is a side elevation further illustrating the centrifugal weight and the parts associated therewith. Fig. 3 is a face view of the dial and scale and further illustrating the arrangement for effecting the movement of the needle. Fig. 4 is a partial section taken substantially at right angles to the axis of rotation of the weight and particularly illustrating part of the means for transmitting the movement of the weight to the needle.

Referring more particularly to the parts, 10 represents the case of the instrument which may be of any suitable form including a frame 11 in which a centrifugal shaft 12 is mounted to rotate preferably in a vertical position as indicated. The lower end of this shaft is adapted to be connected by a flexible shaft or in any other suitable way with a moving part such as the wheel of an automobile the speed of which is to be measured.

When the instrument is intended for an automobile, the instrument does not measure the speed of rotation of the wheel except indirectly by indicating the speed of the automobile in miles per hour on the scale 13 which is on the dial 14 of the instrument. As indicated, this scale 13 is preferably formed with divisions 15 which are uniformly spaced and numbered, that is, there is the same distance between the divisions 30 and 35 as there is between the divisions 50 and 55. Coöperating with the scale 13 there is a needle or pointer 16 the hub of which is attached to a pin 17 which extends through the dial and carries a rigid pinion 18, and within the case there is a segment 19 in the form of an arm having teeth on one end meshing with the pinion for imparting movement to the pinion and to the needle 16.

In order to prevent any loose play in the teeth of the pinion and the segment, I prefer to provide a small spring 20 of common form which is attached to the pinion 18 and tends to hold the pointer 16 up against a stop or pin 21 at the zero position. Near the upper end of the shaft 12 there is mounted a centrifugal weight 22 preferably in the form of a relatively heavy wheel formed with an enlarged central opening 23, that is, much larger than the shaft, and through which the shaft 12 passes, and this weight is preferably attached centrally and in its central plane, indicated by the line 24, to the shaft by means of pivot pins 25. By the term "central plane" of the weight, I mean the plane which is parallel with the upper and lower faces 26 and 27 of the wheel and substantially equidistant between them, if the weight is of substantially symmetrical form.

Under the action of centrifugal force, the weight 22 tends to move away from its normal inclined position in which it is illustrated in Fig. 2, and it tends to oscillate down under the action of the centrifugal force, about its pivots 25 so that the central plane 24 of the weight tends to approach a position in which it is more nearly at right angles to the axis of the shaft 12. This movement of the weight under the action of centrifugal force is resisted by a spring arranged in any suitable manner but preferably associated with the mechanism which imparts the movement to the needle. For this purpose, I prefer to provide the shaft 12 with a fixed collar 28 on the opposite sides of which are attached two bars or levers 29 which are attached parallel to each other and which form a cross head 29$^a$ one end of which is connected by a suitable link 30 with a collar 31 mounted to slide freely on the lower end of shaft 12. The collar 28 is preferably mounted up in the opening 23 in the weight, and the bars 27 are preferably provided at their middle points with upwardly extending ears 32 which are pivotally attached by pins 33 on opposite sides of the collar. The end of the lever or cross head 29$^a$ opposite to the link 30 is preferably provided with a small anti-friction roller 35.

A spring is provided arranged in any suitable manner to resist the tendency of the weight 22 to come down to a horizontal position. This is preferably accomplished by means of a coil spring 36 disposed around the shaft 12 with its upper end pressing against the side of the aforesaid collar 28, the lower end pressing against the sliding collar 31. The collar is grooved, that is it has a continuous circumferential groove 37, in which pins or gudgeons 38 engage, said gudgeons being carried by forks of a yoke 39; the movement of this yoke up and down with the collar 31 is imparted to a spindle 40 which carries the aforesaid segment 19. For this purpose, the spindle 40 is preferably provided with the aforesaid bar 41 to which the yoke 39 is preferably attached by a swivel pin or spindle 42. In order to make this swivel connection, the yoke is preferably provided with an outwardly projecting arm 43 the end of which is turned up so as to form an ear 44, and the ends of this swivel pin 42 are mounted in this ear and in the yoke 39. This arrangement tends to take up any twisting movement in the yoke without imparting it to the lever, and was disclosed in the application referred to above. By employing the ears 32 I am enabled to place the collar 28 higher up on the shaft which has the desirable effect of enabling me to use a longer spring. The longer spring gives a more accurate reading at the scale.

I provide means on the weight 22 for engaging the lever or cross head 29$^a$ through the medium of the roller 35 arranged so that the movement of the lever which is imparted to the needle 16 will result in producing an equal amount of angular movement of the needle for the same change of speed at any point on the scale 13. For this purpose I prefer to provide the under face of the weight 22 with a cam preferably in the form of a cam block 45 having a cam face 46 which is inclined with respect to the middle plane 24 of the weight, and in the present instance, it is also inclined to the radial line extending from the pivot point 25, that is, from the axis of oscillation of the cam. This cam block is preferably mounted to be adjusted and for this purpose it may be mounted so as to slide in a slot 47 in the under face of the weight and the weight may be provided with a set screw 48 for clamping the cam block in any desired adjusted position.

When the instrument is in use, it will be evident that as the speed of rotation increases, the weight 22 will tend to swing or oscillate on the pivots 25 so that it approaches a position substantially at right angles to the axis of the shaft 12. As this movement occurs, the cam face 46 presses down on the roller 35 and tilts the cross head 29$^a$ toward the horizontal position and this pulls up on the collar 31 and imparts movement to the needle 16 through the spindle 40 and the segment 19.

In calibrating an instrument embodying these improvements there is no necessity for adapting the scale to the instrument but the calibration is effected usually by a mere adjustment of the cam 45 to its proper position.

The instrument illustrated includes counting mechanism 49 for indicating the total mileage at the large window 50 in the dial; and for indicating the mileage of any trip at the small window 51. The counter wheels 52 are driven in any suitable manner such as by means of gear wheels 53 and 54 the former of which is on the shaft 12 and the latter of which drives a worm 55 meshing with a pinion 56 which imparts movement to the counter wheels 52.

By attaching the oscillating weight 22 as near as possible to the upper end of the shaft 12 and attaching the collar 31 as near as possible to the lower end of the shaft, I am enabled to make the spring 36 relatively long and this feature coöperates advantageously with the uniformly divided scale as it tends to effect a movement of the pointer 16 through an equal angle for equal changes in the speed, and also tends to simplify the form of the cam 45. This effect is also augmented by the use of the enlarged opening in the weight and the ears on the lever which attach to the collar 28 which is disposed in this opening.

It is understood that the embodiment of the invention described above is only one of the many embodiments or forms the invention may take, and I do not wish to be limited in the practice of the invention, nor in my claims, to the particular embodiment set forth.

What I claim is:—

1. In a speedometer, in combination, a shaft adapted to be driven by a moving part the speed of which is to be indicated, a centrifugal weight carried by said shaft and adapted to move under the action of centrifugal force, an indicating lever, a dial having a scale coöperating with said needle, mechanism for imparting movement from said centrifugal weight to said needle including a lever pivotally carried on said shaft, and a cam on said weight for actuating said lever to give said needle an equal angular movement for a given speed change at any point on said scale.

2. In a speedometer, in combination, a shaft adapted to be driven by a moving part the speed of which is to be indicated, a centrifugal weight in the form of a wheel pivotally mounted on said shaft and normally disposed with its central plane inclined to the axis of said shaft, a lever pivotally mounted on said shaft, a dial with equidistant numbered divisions, a needle coöperating therewith, means for moving said needle by said lever to indicate the speed, said wheel operating to move under the action of centrifugal force to assume a position in which its central plane is more nearly at right angles to the axis of said shaft, a spring tending to resist the movement of said wheel under the action of the centrifugal force and a cam on said wheel for engaging said lever having a face inclined to the central plane of said wheel, and operating to give said needle an equal angular movement for a given speed change at any point on the said scale.

3. In a speedometer, in combination, a shaft adapted to be driven by a moving part the speed of which is to be indicated, a centrifugal weight having a pivotal connection on said shaft and normally disposed with its central plane inclined to the axis of said shaft, a lever pivotally mounted on said shaft, a dial with equidistant numbered divisions, a needle coöperating therewith, means for moving said needle by said lever to indicate the speed, said weight operating to move under the action of centrifugal force to assume a position in which its central plane is more nearly at right angles to the axis of said shaft, a spring tending to resist the movement of said weight under the action of the centrifugal force, and a cam adjustable radially on said weight for engaging said lever, having a face inclined to a radial line extending from said pivot point, and operating to give said needle an equal angular movement for a given speed change at any point on the said scale.

4. In a speedometer the combination of a shaft adapted to be driven by a moving part the speed of which is to be indicated, a centrifugal weight carried by said shaft adjacent the upper end thereof, constructed to swing under the action of the centrifugal force, an indicating needle, a dial having a scale coöperating with said needle, said scale having uniformly equidistant numbered divisions, a collar attached to said shaft adjacent said weight, and a lever pivotally attached to said collar, a sliding collar on said shaft near the other end thereof, and connected with said lever, a spring between said collars and tending to move said sliding collar away from said first named collar, and means actuated by said sliding collar for actuating said needle.

5. In a speedometer the combination of a shaft adapted to be driven by a moving part the speed of which is to be indicated, a centrifugal weight carried by said shaft adjacent the upper end thereof, constructed to swing under the action of the centrifugal force, an indicating needle, a dial having a scale coöperating with said needle, said scale having uniformly equidistant numbered divisions, a collar attached to said shaft adjacent said weight, and a lever having upwardly extending ears pivotally attached to said collar, a sliding collar on said shaft near the other end thereof, and connected with said lever, a spring between said collars and tending to move said sliding collar away from said first named collar, and means actuated by said sliding collar for actuating said needle.

6. In a speedometer the combination of a shaft adapted to be driven by a moving part the speed of which is to be indicated, a centrifugal weight carried by said shaft adjacent the upper end thereof, having an opening through which the shaft passes and constructed to swing under the action of the centrifugal force, an indicating needle, a dial having a scale coöperating with said needle, said scale having uniformly equidistant numbered divisions, a collar attached to said shaft within the said enlarged opening of said weight, and a lever pivotally attached to said collar, a sliding collar on said shaft near the other end thereof, and connected with said lever, a spring between said collars and tending to move said sliding collar away from said first named collar, and means actuated by said sliding collar for actuating said needle.

In testimony whereof I have hereunto set my hand in presence of two subscribing witnesses.

NIXON LEE.

Witnesses:
G. G. GUEARLY,
PAUL MULLER.

Copies of this patent may be obtained for five cents each, by addressing the "Commissioner of Patents, Washington, D. C."